United States Patent
Albert et al.

(10) Patent No.: US 7,578,327 B2
(45) Date of Patent: Aug. 25, 2009

(54) MOUNTED TUBELESS ASSEMBLY FOR CYCLE, RIM AND TUBELESS TYRE

(75) Inventors: Loïc Albert, Clermont-Ferrand (FR); Bernard Moreau, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 325 days.

(21) Appl. No.: 11/034,725

(22) Filed: Jan. 14, 2005

(65) Prior Publication Data

US 2005/0121130 A1 Jun. 9, 2005

Related U.S. Application Data

(63) Continuation of application No. PCT/EP2003/007368, filed on Jan. 22, 2004.

(30) Foreign Application Priority Data

Jul. 15, 2002 (FR) .................................. 02 08931

(51) Int. Cl.
*B60B 21/02* (2006.01)
*B60B 21/04* (2006.01)
*B60B 21/10* (2006.01)
*B60C 15/024* (2006.01)

(52) U.S. Cl. ................... 152/375; 152/544; 152/378 R; 152/379.3; 152/383

(58) Field of Classification Search ................ 152/382, 152/383, 544, 375, 378 R, 379.3, 379.4, 379.5, 152/381.3, 381.4
See application file for complete search history.

(56) References Cited

U.S. PATENT DOCUMENTS

| | | | | |
|---|---|---|---|---|
| 2,033,882 A | * | 3/1936 | Darrow | 152/381.3 |
| 4,209,051 A | * | 6/1980 | Udall | 152/544 |
| 4,241,776 A | * | 12/1980 | Stewart | 152/381.4 |
| 4,353,403 A | * | 10/1982 | Ruip | 152/544 X |
| 4,561,481 A | | 12/1985 | Kawauchi et al. | |
| 5,573,612 A | * | 11/1996 | Tagashira et al. | 152/544 |
| 6,976,517 B2 | * | 12/2005 | Albert et al. | |
| 2004/0155519 A1 | * | 8/2004 | Albert et al. | 152/544 X |

FOREIGN PATENT DOCUMENTS

| | | |
|---|---|---|
| DE | 44 44 044 | 6/1996 |
| DE | 197 29 824 | 1/1998 |
| DE | 298 08 506 | 7/1998 |
| EP | 0 790 141 | 8/1997 |
| EP | 0 893 280 | 1/1999 |

(Continued)

*Primary Examiner*—Adrienne C Johnstone
(74) *Attorney, Agent, or Firm*—Buchanan Ingersoll & Rooney PC (57) ABSTRACT

A mounted assembly of the tubeless type for a bicycle, includes a rim and a tire having beads. The rim includes two wings attached to two seats which receive the tire beads. A tire reception zone is formed between the wings. The rim and/or the tire includes a stabilizing structure for stabilizing the air pressure at the level of the tire's outer surface, in zones which are neither in contact with the ground nor in contact with the rim, to a value of less than 2 bar. The stabilizing structure enables air to be conducted from the tire to atmosphere if a bead loses contact with its seat. The stabilizing structure can be in the form of holes in the wings and/or the seats, or in the form of channels or projections disposed on the wings. Alternatively, the stabilizing structure can be in the form of projections formed on the tire sidewall and arranged to contact the wings.

13 Claims, 5 Drawing Sheets

FOREIGN PATENT DOCUMENTS

| | | | | |
|---|---|---|---|---|
| JP | 05169563 A | * | 7/1993 | |
| JP | 06191201 A | * | 7/1994 | |
| JP | 08067104 A | * | 3/1996 | |
| JP | 08216604 A | * | 8/1996 | |
| JP | 10217705 A | * | 8/1998 | |
| JP | 2000177304 A | * | 6/2000 | |

* cited by examiner

MOUNTED TUBELESS ASSEMBLY FOR CYCLE, RIM AND TUBELESS TYRE

This application is a continuation of International Application Ser. No. PCT/EP2003/007368 filed on Jan. 22, 2004 and which claims priority from French Application No. 02/08931 filed on Jul. 15, 2002.

BACKGROUND

The invention relates to a mounted assembly for a cycle, more particularly for a bicycle, consisting of a rim and a tyre. The invention is directed also at a rim for a cycle wheel and a tyre for a cycle. The invention is directed more particularly at cycles intended to be used with tyres which have to function without inner tube, of the "tubeless" type.

A conventional single-part rim of the tubeless type, intended in particular for automobile vehicles, consists of various zones; first of all, starting from an outer edge of the rim, there is a rim flange, or wing, whose essential task is to retain the bead of the tyre in the inflated state; then the bead seat, on which rests the bead of the tyre and which ensures clamping thereof, as well as air-tightness; and finally a groove designed to allow mounting of the tyre due to its smaller diameter than that of the flange. In the case of a rim comprising humps, the latter are present between the bead seat and the groove which permits mounting. Humps are projections whose function is to prevent or at least to delay the occurrence of unwedging of the tyre in particular in the case of a drop in pressure.

The conventional process for mounting a tubeless tyre on such a rim comprises various stages, which are as follows; firstly, a part of the first bead is passed over the rim flange and this part is placed in the groove. The rest of the bead may then be passed over the flange thanks to slight ovalisation of the corresponding bead wire of the tyre. The same applies to passing the second bead over the flange of the rim. Mounting is then completed by a final stage involving inflation to a pressure which is such that it ensures positioning of the beads on the seats resting on the rim flanges. During the latter stage, the beads pass over the humps which form an obstacle to passage of said beads as far as their respective seat.

Bicycle tyres exhibit certain peculiarities; in effect, the bead wires are very flexible and deformation of the bottom zone may thus be considerable. This is not without drawback in the case of a tubeless tyre since tightness must be complete between the rim and the tyre and more precisely between the rim and the beads of the tyre.

Although not limited to such applications, the invention will be more particularly described with reference to mounted assemblies intended to be fitted on bicycles for road use. A particular feature of these mounted assemblies is that the operating pressure is of the order of 8 bar.

It is currently known to make mounted assemblies of the tubeless type for bicycles of the all terrain type; the operating pressure of such tyres is of the order of 2 bar. Patent application EP 0 893 280 has already described an improved rim which facilitates the inflation conditions of such a tubeless tyre and which improves the resistance of the tyre when inflated in the event of violent lateral impact. Such a rim is characterised by the presence on the one hand of a narrow groove which promotes the inflation phase by ensuring tightness between the beads and the rim; and on the other hand, this rim is characterised by the presence at the groove edge of humps which permit retention of the beads of the tyre on the seats provided to this end in particular in the event of violent lateral impact, for example in the event of impact against stones.

Use of this type of rim to produce a mounted assembly intended for road use and therefore brought to pressures of the order of 8 bar is impossible. It transpires that, if the use of a rim such as that described by the patent application EP 0 893 280 effectively allows inflation of the tyre to be initiated with certainty, whatever the characteristics of the tyres tested, beyond a certain pressure unwedging of at least one bead occurs with the consequence that the tyre rolls off the rim. Furthermore, the pressures reached at the time of unwedging of the beads of the tyre are generally lower than 8 bar and therefore lower than the operating pressure commonly required and distinctly lower than the pressures which may be reached in extreme situations such as that described above.

The Applicant has already produced rims of another type for production of a mounted assembly intended for road use. Such a cycle wheel rim is characterised by bead seats having, depending on the profile of the rim in a radial plane, a generatrix whose outer end is on a circle of a diameter which is less than the diameter of the circle on which is located the axially inner end, said generatrix forming an angle with the axis of rotation of the tyre of between 15 and 45 degrees.

"Axial" is understood to mean a direction parallel to the axis of rotation of the rim and "radial" to mean a direction intersecting the axis of rotation of the rim and perpendicular thereto. The axis of rotation of the rim is the axis about which the rim turns in normal use. The median circumferential plane is a plane perpendicular to the axis of rotation of the rim and which divides the rim into two halves. A radial plane is a plane which contains the axis of rotation of the rim.

The tests performed with these rims show that it is possible to achieve the operating pressure for road use during mounting without observing any unwedging of the beads.

The improvements made to the profile of the rim thus designed therefore permit the production of a mounted assembly of the tubeless type for road use which guarantees satisfactory inflation.

The rim profile thus defined makes it possible to maintain rim/bead contact at higher pressures than those measured during unwedging of the bead on a known rim.

However, it would appear that where the conditions of use involve subjection of the mounted assembly to extreme conditions, it is possible to observe looseness of the tyre or even unwedging thereof. The pressure may reach values of the order of 11 bar when the tyres are subjected to such extreme conditions, in particular during competitions when the temperature of the internal air of the tyre may increase very substantially, and lead to an increase in pressure. This is the case, for example, during heavy braking when descending hills, when the friction of the brake pad on the rim results in such an increase in temperature.

The inventors thus set about trying to produce a mounted assembly consisting of a rim and of a tyre of the tubeless type which does not present any risks to the user, in particular that of the tyre rolling off the rim, at the pressures conventionally required for this envisaged type of use.

SUMMARY OF INVENTION

This aim was achieved according to the invention by a mounted assembly of the tubeless type for a cycle, consisting of a rim and of a tyre comprising in particular beads, said rim consisting in particular of two wings, attached to two seats, intended to receive the beads of a tyre, the rim and/or the tyre comprising means for stabilising the air pressure at the level of the outer surface of the tyre, in the zones which are neither in contact with the ground nor in contact with the rim, to a value of less than 2 bar.

Stabilisation is advantageously obtained according to the invention virtually instantaneously by operation in the manner of a safety valve.

The outer surface of the tyre is defined as being the surface which is not in contact with the inflation air of said tyre when it is mounted on a rim.

According to an advantageous variant of the invention, the rim and/or the tyre comprise means for stabilising the pressure of the air at the level of the outer surface of the tyre, in the zones which are neither in contact with the ground nor in contact with the rim, to atmospheric pressure.

Stabilisation of the pressure is advantageously obtained by means for draining the air from the tyre to the atmosphere when at least one of the beads is not in contact with a seat.

According to the invention, the air which passes between the bead of the tyre and the seat of the rim, due to loosening of the tyre in particular when the mounted assembly is subjected to extreme conditions, may be evacuated towards the atmosphere such that the presence of a high pressure under the bead and/or on the outer sidewall of the tyre is only fleeting.

As they proceeded, the inventors succeeded in showing that, whichever rims are used for tubeless applications, they may have weaknesses with regard to wedging of the beads of a tubeless-type tyre when used under extreme conditions for a given use. Studies have shown that, when the pressure increases, the flexibility of the bead wires leads to air passing under the bead, resulting in a considerable rapid increase in the tension borne by the bead wire corresponding to a loosening of the bead relative to the corresponding seat of the rim.

The inventors then succeeded in showing that the increase in the surface area of the bead in contact with the air, due to its loosening relative to the seat of the rim, leads to unwedging of the bead at pressures lower than those which have to be reached for the same result when contact remains between bead and rim. It therefore ensues that, as soon as the pressure corresponding to loosening of the bead is reached, the risk that the beads will become unwedged and the tyre will roll off the rim becomes very considerable.

The invention also proposes a rim conformed to such a mounted assembly, satisfying the requirements of the invention for all types of tyres.

The invention thus proposes a rim for a cycle wheel, designed to receive a tyre comprising in particular two flexible bead wires to form a mounted assembly, said rim consisting of two wings, attached to two seats intended to receive the beads of a tyre and separated by a rim recess, the wings and/or the seats comprising on their surfaces oriented towards the tyre reception zone at least one channel conducting air outside said zone, said channel widening from one end situated in the reception zone towards the other end opening outside said zone.

The tyre reception zone is defined by the wings, the seats, the rim recess and a surface of revolution passing through the apex of the wings.

In one advantageous embodiment of the invention, the channel is sealed by a permeable material; such an embodiment makes it possible in particular to prevent said channel from becoming filled with dirt.

According to a first variant embodiment of a rim according to the invention, the channel is made in relief at least over part of the surface of the wings.

Embodiment of a channel in relief includes a recessed channel, for example forming grooves, and a channel formed by the presence of projections and also embodiments combining recesses and elevations. In all cases, the channel flares from the tyre reception zone towards the end of the channel outside said zone.

According to this variant embodiment, when the wings comprise hooks, the channel is in relief at least on the hook.

According to this variant, it is also possible to provide a channel which runs over the entire surface of the wing and which is extended over part of the seat of the rim; such an embodiment allows the pressure to be stabilised when the bead becomes slightly loosened from the seat and remains in contact with the wing. Such a channel advantageously does not exceed two thirds of the width of the surface of the seat of the rim.

A rim according to this first variant may, according to a first embodiment of the invention, be produced directly according to the conventional methods known to the person skilled in the art, such as bending, rolling and welding methods, in particular used to produce aluminium rims.

According to another embodiment of the invention, the rim is obtained by connecting a rim blank and at least one added element which forms the channel in relief as has just been defined according to the invention.

Variants of the invention according to the latter embodiment may also provide for the added elements to be made of a material other than that of the rim blank.

The invention also provides for the added elements to be fixed to the rim blank by any means known to the person skilled in the art such as for example par screwing, clipping, crimping, adhesive bonding, etc.

According to a second variant embodiment of a rim according to the invention, the channel is a hole passing through the walls forming the wings and/or the seats. According to the invention, the smaller orifice of the hole opens in the rim reception zone, so as to obtain sufficiently rapid pressure stabilisation in particular so as not to lose too much inflation air from the tyre.

The flared shape of the hole, the latter having one orifice larger than the other, on the one hand permits rapid stabilisation of the pressure but also has other advantages. In particular, when the hole is formed in the wall of the wing of the rim, it may become clogged up; the flared shape allows self-cleaning of the orifice due to the pressure. Furthermore, said flared shape also makes it possible to prevent the creation of noise resulting from the escape of air or alternatively the creation of turbulence which could disturb rotation of the wheel, in particular at high speed.

According to one advantageous embodiment of this second variant embodiment of the rim according to the invention, the section of the hole varies continuously in the thickness of the wall. According to another embodiment, the hole is formed by two coaxial holes of different diameters. According to one or other of these embodiments, the hole may additionally serve as a rim wear indicator. In effect, the rim which may wear as a result of brake pad friction shows a variation in the diameter of the orifice of said hole which may be provided to indicate a wear threshold which must not be exceeded. This variation is advantageously sharp in the case of two coaxial holes.

When such a hole is provided in the wall forming the rim seat, a first embodiment provides for said rim to comprise several holes distributed over the periphery of the seat. A second embodiment provides for the rim to comprise only one hole positioned in a groove formed on said rim seat to allow the air to circulate in said groove in such a way that the air is conducted as far as the hole whatever the loosening zone of the tyre over the periphery of the rim seat. A third embodiment combines several holes placed in a groove like that of the second embodiment.

A third variant embodiment of a rim according to the invention provides for the channel to be a combination of the first two variants, that is to say that the invention provides for the combination of one or more holes, passing through the walls forming the wings and/or the seats, and at least one relief formed at least over part of the surface of the wings.

According to a preferred embodiment of the rim according to the invention, in particular for application of the rim to road use, in accordance with the profile of the rim in a radial plane the seats of the beads have a generatrix whose axially outer end is on a circle of a smaller diameter than the diameter of the circle on which is located the axially inner end, said generatrix being frustoconical and forming an angle with the axis of rotation of the tyre of between 15 and 45 degrees.

Such a rim profile promotes mounting of a tyre of the tubeless type on said rim to form a mounted assembly intended for road use.

According to a preferred embodiment of the invention, the generatrix forms an angle with the axis of rotation of the tyre of between 16 and 26 degrees. Even more preferably, the angle of the generatrix is greater than 18°. Even more preferably, the angle is less than 22° in particular to simplify industrial production of the rim.

According to a preferred embodiment of the invention, the difference in diameter between the ends of the generatrices of the seats of the beads is between 0.5 and 3 mm and more preferably this difference is greater than 1 mm and more preferably it is strictly greater than 2 mm. Such differences in diameter between the ends of the generatrix of the bead seats assist in maintaining contact between the bead and the rim seat when the pressure increases.

Advantageously, the invention provides for the rim, whose groove consists of a groove bottom and two lateral walls, to be such that at least the top parts of the lateral walls form an angle of at least 35° and are centred relative to the median circumferential plane. Such an angle in particular promotes mounting of the tyre on the rim; in effect, the arrangement of the bead seats may be a problem when it comes to mounting the tyre, owing in particular to the fact that this arrangement entails greater clearance, in particular in terms of the necessary deformation of the beads during mounting, than is imposed by a conventional rim. The variant embodiment of the invention proposes a groove wall, at least in its upper part, that is to say in the zone immediately upstream of the clearance which leads to the seat of the bead, with an inclination which is less steep than that proposed by conventional rims; such a wall inclination allows easier clearance, allowing sliding of the bead over this top part of the wall.

This variant embodiment will on the one hand ensure better positioning of the beads on their seat and in particular better symmetry of the positioning of said beads. On the other hand, less sharp deformation of the bead wires makes it possible to limit the risk of incipient damage to said bead wires.

Also advantageously, the invention provides for the bottom parts of the walls of the groove to form an angle of at most 35° and to be centred relative to the median circumferential plane. Such an embodiment ensures in particular that the groove bottom is sufficiently wide, so making it possible to accommodate the two beads of the tyre before the beginning of the inflation phase of mounting of said tyre on the rim.

According to one advantageous embodiment of the invention, the wings of the rim comprise hooks which constitute an overhang towards the inside of the rim at the apex of each of the wings.

More preferably, the hooks constitute an overhang towards the inside of the rim of at least 0.5 mm relative to the surface of the wing at the point of attachment of said hook.

The presence of such hooks allows an increase in the effectiveness of tyre retention without observing unwedging of the beads.

An advantageous variant of the invention provides for the presence of humps, disposed between the groove and the seats of the beads, and more precisely between the end of the top part of a wall of the groove and the axially inner end of a bead seat. Such an embodiment may also contribute to delaying loosening of the beads relative to the surface of the rim when the pressure increases within the tyre. The function of these humps is more specifically to keep the beads on their seats in particular in the event of deflation of the tyre or of a puncture.

According to one advantageous embodiment of the invention, the rim is obtained by connecting a rim blank and at least one added element which forms the seats of the beads as have just been defined. In the event of the presence of humps, the invention may also provide according to this variant for said humps to constitute part of the added elements. When the rim is formed with channels in relief as described above, the added elements on a rim blank may also be the same as those which have just been mentioned and comprise all these elements.

In an advantageous variant of the invention, in particular in the case of a tubeless-type tyre, the zone of the rim receiving the tyre forms an upper bridge comprising an orifice for the inflation valve.

Said inflation orifice is furthermore preferably provided in the mounting groove and more preferably in the bottom or base zone of said groove. Such a design promotes inflation of a tyre of tubeless type, the air being capable of being introduced directly between the beads of the tyre, these being previously inserted in the mounting groove.

According to a preferred embodiment of the invention, the rim is connected to a central hub of the wheel by a plurality of spokes fixed to a lower bridge of the rim.

It would appear that, with mounted assemblies of the tubeless type comprising a rim such as described according to the invention, for road use, it is possible to reach pressures of the order of 11 bar, that is to say pressures which correspond to the most extreme conditions to which the mounted assemblies may be subjected, without any risk for the user and in particular without risk of unwedging.

The invention also proposes a tyre conformed to such a mounted assembly independently of the rim such as described according to the invention.

The invention thus proposes a tyre for a cycle, of the tubeless type, comprising in particular two flexible bead wires, provided for connection with a rim to form a mounted assembly, said rim consisting of two wings, attached to two seats and comprising a free end, said tyre comprising means for draining air as far as the external part of said wings, said means extending at least from the part of the sidewalls coming into contact with the wings after mounting as far as the base of the beads coming into contact with the seats after mounting.

The means for draining air advantageously do not extend over the base of the bead beyond a distance corresponding to two-thirds of the surface of the seats starting from the wing. The drainage means must not be too close to the inflation volume so as not to risk causing deflation of the tyre in normal use.

According to a first embodiment of the tyre according to the invention, the means for draining air are in relief.

More preferably, the reliefs are created by adding supplementary elements on the sidewalls of the tyre.

However they are embodied, the drainage means thus constituted must be kept at pressures corresponding to the extreme conditions; consequently the material constituting these reliefs advantageously has deformability properties.

According to a second embodiment of the tyre according to the invention, the means for draining air are complementary elements of porous material fixed to the outer sidewalls of the tyre and part of the base of the bead.

One preferred embodiment of the invention provides a textile fabric fixed between the sidewall and the base of the bead; the tests performed show that such an embodiment makes it possible to preserve the draining action whatever the pressure exerted on the fabric, said fabric being at least caught between the wing of the rim and the pressure of the tyre exerted through the sidewall.

According to one variant embodiment of the tyre according to the invention, the beads of the tyre comprise at least one lip and said lips are capable of resting on at least part of the lateral walls of the mounting groove, under travel conditions, that is to say after mounting of the tyre on the rim.

Such a tyre favours mounting of a tubeless-type tyre on said rim to form a mounted assembly designed for road use. The lips of the tyre described with reference to this variant embodiment in particular allow prevention of loosening of the tyre during inflation for road use.

According to a first embodiment of this variant embodiment, the lips are projections of the beads obtained during manufacture of said beads.

According to another embodiment, the lips are obtained by connection of at least one added element to the bead, it being possible for said element to be of a material other than that constituting the beads.

According to a preferred embodiment of the invention, the bead wires of the tyre have a modulus of elasticity of less than 8000 daN/mm$^2$. Beyond such a value, the tyre would be less sensitive to unwedging, owing to the lower flexibility of its bead wires. Also preferably, the modulus of elasticity is greater than 3000 daN/mm$^2$.

The tyre is selected with a development adapted to the rim, according to conventional practices.

BRIEF DESCRIPTION OF THE DRAWINGS

Other advantageous details and features of the invention will become clear below from the description of an example of embodiment of the invention made with reference to FIGS. 1 to 6, in which.

DETAILED DESCRIPTION OF PREFERRED EMBODIMENTS

To simplify understanding thereof, the Figures are not to scale.

Figure 1A:
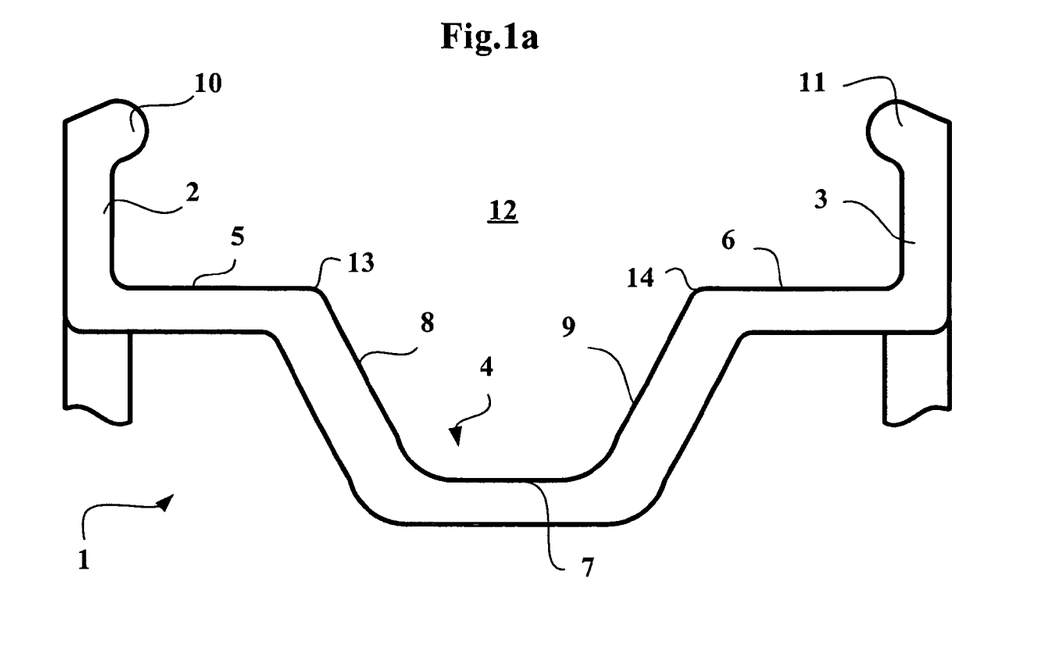
FIG. 1a is a diagram of a partial view in radial section of a rim for a cycle wheel.

FIG. 1a is a diagrammatic representation of a profile in radial section of a rim 1 for a cycle wheel. The rim 1 consists of two wings 2, 3 at the outer ends connected to the mounting groove or rim recess 4 by the bead seats 5, 6. The wings 2 and 3 are oriented substantially parallel to the circumferential median plane. The groove 4 consists on the one hand of a groove bottom 7 and of lateral walls 8, 9. The wings 2 and 3 additionally have at their upper parts hooks 10, 11 which constitute overhangs towards the inside of the rim of 0.5 mm relative to the plane of the wings at the points of attachment of said hooks.

Figure 1B:
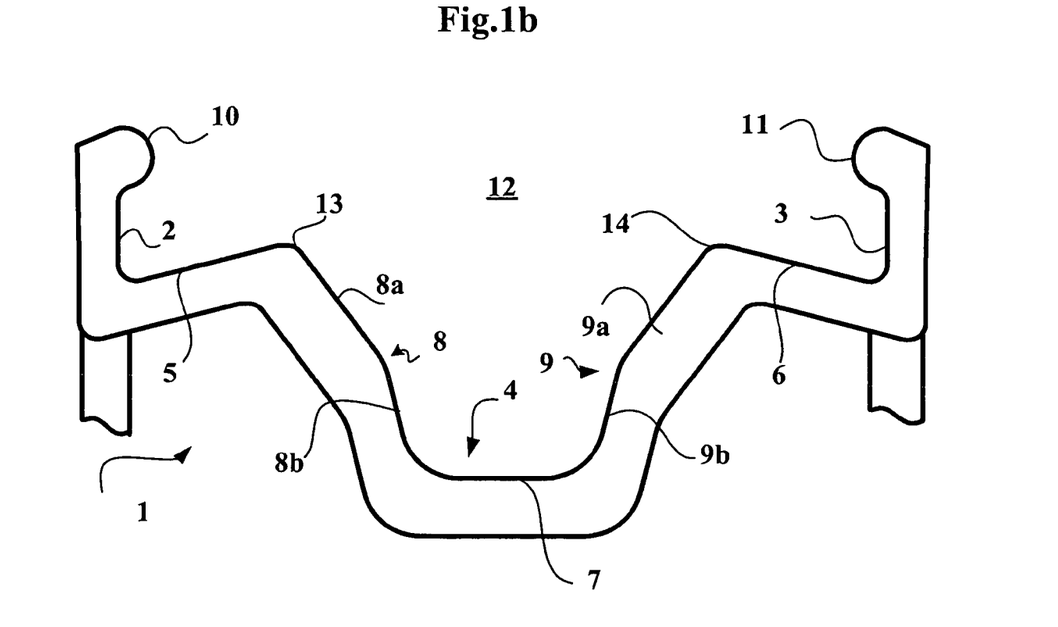
FIG. 1b is a diagram of a partial view in radial section of a second type of rim for a cycle wheel.

According to one variant embodiment shown in FIG. 1b, the bead seats 5 and 6 form an angle with the axis of rotation of approximately 20°. The groove 4 consists on the one hand of a groove bottom 7 and of lateral walls 8, 9 unusually inclined relative to conventional bicycle rims. In the representation in FIG. 1b these walls 8 and 9 are made in two parts; first bottom parts 8b, 9b which form an angle of approximately 30° and are centred relative to the circumferential median plane and second or top parts 8a, 9a which form an angle of approximately 65° and are centred relative to the circumferential median plane.

The tyre reception zone 12 is defined as being the space delimited by the wings 2, 3, the seats 5, 6 and the groove 4.

During mounting of a tyre of the tubeless type, conventional in form, on such a rim, first of all the two beads of the tyre are introduced into the groove 4 of the rim.

This first stage is simple to effect because the bead wires of bicycle tyres are conventionally made of a flexible material such as for example an aromatic polyamide or glass fibres. The use of flexible bead wires for bicycle tyres is linked in particular to the need to simplify mounting of said tyre which is generally performed by the user, possibly with simple, compact tools suitable for transportation. Furthermore, the flexibility of these bead wires also allows the user to transport an unmounted tyre, the space occupied thereby being limited by the fact that it is foldable.

In a second step, the tyre is inflated; for this, the rim 1 is provided with a valve, not shown in the Figures, advantageously placed in the groove bottom 7 to allow the injection of air directly between the two beads of the tyre. The groove bottom 7 is of such a width that it may receive the two beads, these resting against the walls 8 and 9 to ensure that the system is air-tight. This result is achieved in the case of FIG. 1b in particular by the presence of the inclined walls 8b and 9b in particular at the bottom part of the groove 4, which allow the width of the groove bottom 7 to be reduced for a given width of the rim 1.

In the case of a rim such as that illustrated in FIG. 1b, the top part of the walls 8a and 9a of the groove 4 is advantageously more inclined than the bottom part of said walls 8b and 9b to allow the beads to rise up to the apices 13 and 14 of these walls which, relative to conventional rims, such as that illustrated in FIG. 1a, require greater deformation of the beads due to their height. The sharp inclination of the top part of the walls 8a and 9a effectively allows the beads to reach these apices 13 and 14 "gently" and smoothly, which makes it possible to maintain air-tight contact between the beads and the walls and furthermore makes it possible to facilitate positioning of the beads on the seats 5 and 6 of the rim 1, said positioning being obtained symmetrically between the two beads.

The beads of the tyre are thus positioned on the seats 5 and 6 provided to this end, in contact with the wings 2 and 3 which retain said beads. The hooks 10 and 11 of the wings 2 and 3 also assist in maintaining contact between the beads of the tyre and the seats 5 and 6 when the pressure increases within the tyre.

The rim as shown in FIG. 1*b* is more particularly adapted to the production of mounted assemblies intended for road use.

Figure 2A:
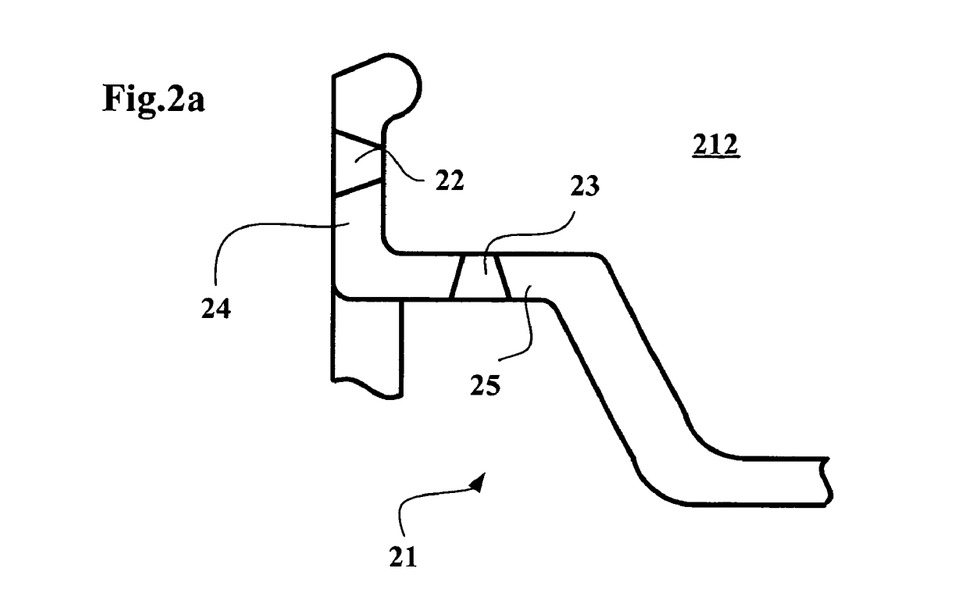
FIG. 2a is a diagram of a partial view in radial section of a first embodiment of a rim according to the invention.

FIG. 2*a* is a diagrammatic representation of a first embodiment of a rim 21 according to the invention. The profile along a radial plane of this rim 21 is advantageously identical to that of the rim 1 illustrated in FIG. 1*a*. The rim 21 comprises through-holes 22, 23 respectively in the wing 24 and at the level of the seat 25. These through-holes create an air conduit from the tyre reception zone towards an outer zone. It is possible for just one or other of these holes to be present. They are advantageously distributed over the entire perimeter of the rim. In a variant embodiment of the invention, it is possible to provide a single hole 22, 23 at the base of a circumferential groove.

In accordance with the invention, the holes 22, 23 are flared from the tyre reception zone 212 towards the outside of the rim 21. Such a shape allows virtually instantaneous pressure stabilisation.

In the case of hole 22, stabilisation of the pressure of the air at the level of the outer surface of the tyre, in the zones which are neither in contact with the ground nor in contact with the rim, is achieved to atmospheric pressure.

The same may be true in the case of hole 23. On the other hand, when the latter opens into an internal, air-tight cavity of the rim 21, stabilisation of the pressure of the air at the level of the outer surface of the tyre, in the zones which are neither in contact with the ground nor in contact with the rim, is achieved to a value of less than 2 bar.

Figure 2B:
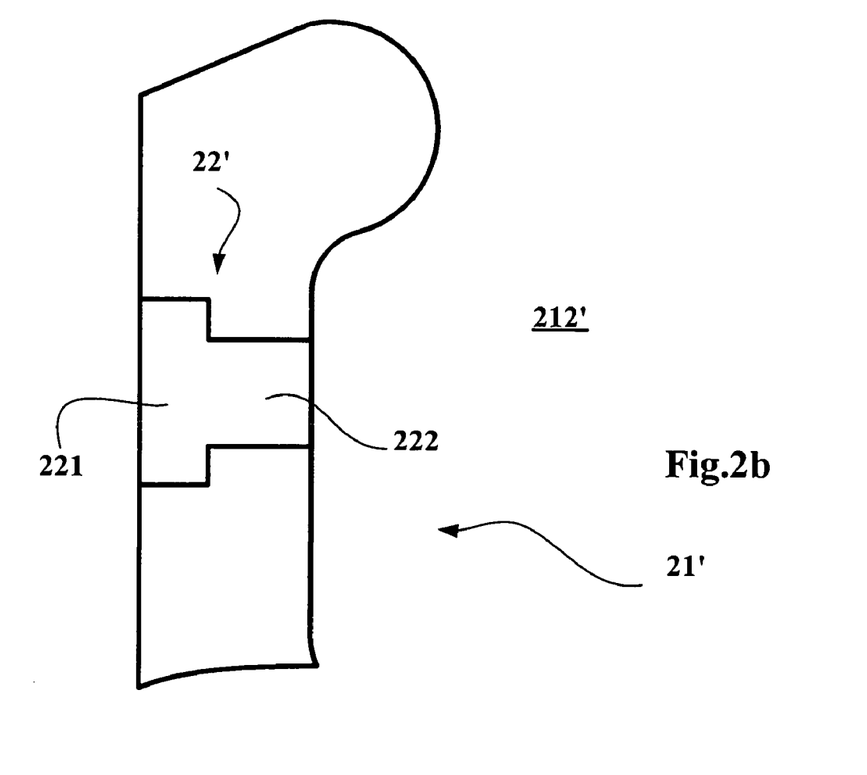
FIG. 2b is a diagram of a partial view in radial section of a variant embodiment of this embodiment of a rim according to the invention.

FIG. 2*b* shows a variant embodiment of a rim 21' according to this embodiment of the invention in the case of a through-hole 22'. This hole 22' consists of 2 successive concentric holes 221, 222; in the present case, the hole 222 opening in the tyre reception zone 212' has a smaller diameter than the hole 221 which opens in the opposite wall of the wing 22'. The hole 221 thus opens in the wall subject to friction from the brake pad. The hole 22' may be used as a rim wing wear indicator; in effect, wear to said wing resulting from pad friction will cause a variation in the diameter of the hole once the worn thickness corresponds to the length of the hole 221. The length of this first hole 221 will therefore advantageously be selected to correspond to the rim wear threshold which must not be exceeded.

Figure 3:
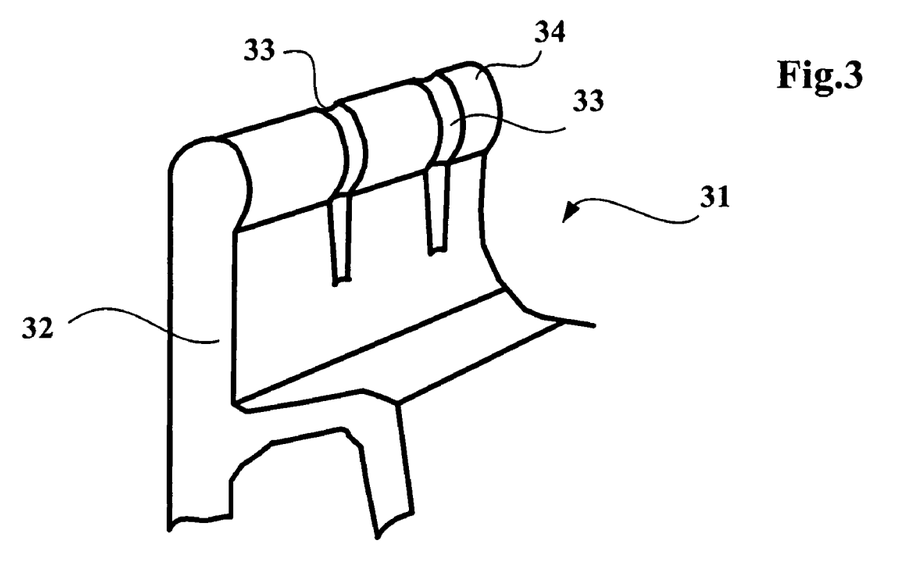
FIG. 3 is a diagram of a perspective view of a second embodiment of a rim according to the invention.

FIG. 3 is a diagram of a perspective view of a second embodiment of a rim 31 according to the invention. On the surface of the wing 32 oriented in the direction of the tyre reception zone, the rim 31 has grooves or flutes 33 which extend as far as the apices of the wings and, in the case of the rim shown, as far as the apex of the hook 34. In accordance with the invention, these flutes 33 are flared, the widest part being at the level of the apex of the hook 34. In the case shown in FIG. 3, these flutes 33 extend over only part of the wing 32; according to the invention, they may extend over the entire height of the wing 32 and even over part of the seat of the rim, and at most over two-thirds of the seat. In these latter instances, the channel thus formed is advantageously flared from one end to the other.

Figure 4:
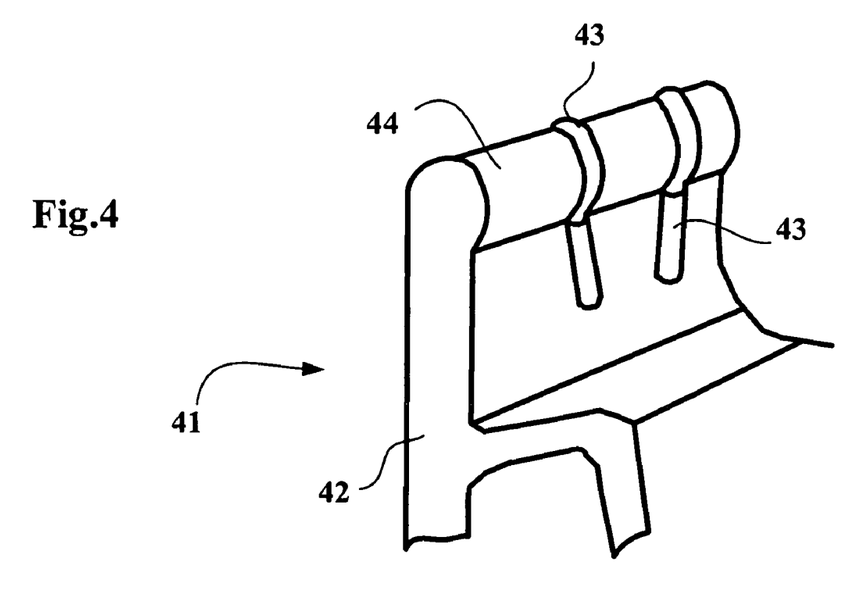
FIG. 4 is a diagram of a perspective view of a third embodiment of a rim according to the invention.

FIG. 4 is a diagram of a perspective view of a third embodiment of a rim 41 according to the invention. On the surface of the wing 42 oriented in the direction of the tyre reception zone, the rim 41 has projections or reliefs 43 which extend, in the manner of the flutes 33 of FIG. 3, as far as the apices of the wings 42 and, in the case of the rim shown, as far as the apex of the hook 44. These projections or reliefs 43 are oriented so as to former a channel which flares in the direction of the apex of the hook 44. Just as in the case of FIG. 3, the projections 43 may extend over the entire height of the wing 42 and even over part of the seat of the rim.

In the case of the embodiment shown in FIG. 3, conduction of the air from the tyre reception zone towards the outside is ensured by the flutes 33, whose volume remains free when the tyre is mounted on the rim 31. In the case of FIG. 4, conduction of the air is ensured in the same manner by the grooves which are created between two projections 43.

Rims such as those described with reference to FIGS. 3 and 4 may for example be produced by the addition of complementary elements comprising either flutes or projections which are added and fixed to a rim blank.

Producing a rim of this type according to the invention in several elements may optionally allow simplification of industrial production of such a rim with a complex profile. Such an embodiment may, moreover, allow modification of existing rims by the addition of said supplementary elements. In effect, in this case the added elements are so defined as to complete the profile of an existing rim in order to obtain the profile defined by the invention.

Figure 5:
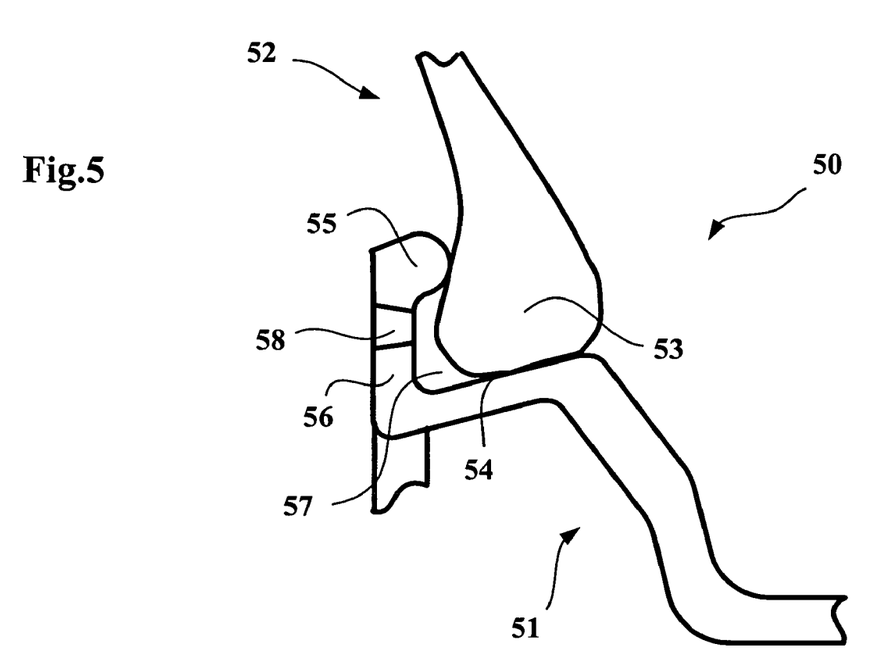
FIG. 5 is a diagram of a partial view in radial section of a mounted assembly according to the invention.

FIG. 5 shows a diagram of a partial view in radial section of a mounted assembly 50 according to the invention comprising a rim 51 according to the invention and a tubeless-type tyre 52 of conventional structure. The bead 53 of the tyre 52 rests on the seat 54 of the rim 51 and ensures the tightness of the inflation volume after mounting. The tyre 52 is also in contact with the rim 51 at the level of the hook 55 or top part of the wing 56 of the rim 51. This contact is likewise air-tight. In the event of excess pressure within the tyre, for example when the mounted assembly 50 is subject to extreme conditions, it is possible to observe a loosening of the bead 53 from the seat 54. In such a situation, the inflation air passes between the bead 53 and the seat 54 and is caught in the zone 57. Tests and experiments performed by the inventors have demonstrated that the presence of elevated pressure at the surface of the bead of the tyre may lead in this instance to the tyre rolling off the rim, owing in particular to the flexible bead wires. In effect, the results obtained show that the increase in the surface area of the bead in contact with air at a given pressure leads to a not inconsiderable increase in the tension borne by the bead wire. In the case of excess pressure of the order of 11 bar, the increase in said tension may result in the tyre rolling off the rim.

The rim 51 comprises according to the invention holes 58 distributed over the periphery of the rim, which allow stabilisation of the pressure in the zone 57 to atmospheric pressure. The flared profile of the holes 58 and their number is thus so defined that stabilisation is virtually instantaneous, in such a manner that only a very small volume of air escapes before the bead 53 resumes its position on the seat 54 and recreates air-tight insulation of the inflation zone at the level of this contact.

Tests have also demonstrated that the presence of the holes 58 according to the invention improves positioning of the bead during mounting. In effect, the holes 58 allow elimination of the air which is trapped between the rim and the tyre at the level of the zone 57 and thus facilitate positioning of the tyre and more precisely of the bead. In effect, no risk remains of an occluded pocket of air, which might make it difficult to position the bead or indeed lead to incorrect positioning thereof and in particular to asymmetrical positioning.

Tests were performed with a mounted assembly such as described in FIG. 5 of the size 23-622 on a 622 rim using tubeless technology. The tyres used are tyres of the tubeless type whose bead wires have a modulus of elasticity of 4000 daN/mm$^2$. For road use, the operating pressure is generally 8 bar. Knowing, as stated above, that in extreme conditions the pressure reached may be greater, the tests are performed until these extreme conditions are attained.

In the case of the rim according to the invention, the tests have demonstrated that mounting of a tubeless tyre on this rim may be performed without a hitch at an operating pressure of 8 bar and in extreme conditions, in particular in terms of heating, without observing unwedging.

Figure 6:
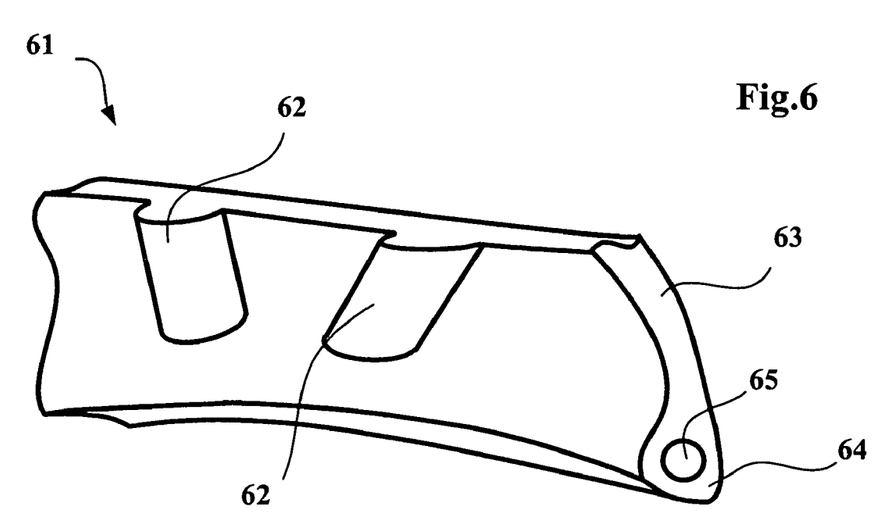
FIG. 6 is a diagram of a partial perspective view of a tyre according to the invention.

FIG. 6 shows another variant embodiment of the invention according to which the tyre 61 has zones in relief 62 at the level of the bottom part of the sidewall 63 and/or at the level of the bead 64, comprising a bead wire 65. In the case of FIG. 6, these zones in relief 62 are formed on the bottom part of the sidewall so as to allow the passage of air towards the space external to the tyre reception zone of the rim on which such a tyre 61 is positioned. The air ducts are provided according to the invention with a flared form to allow virtually instantaneous stabilisation of the pressure to atmospheric pressure and recreation of air-tightness between the base of the bead and the rim seat.

An air duct is thus formed by a pair of zones in relief 62; the maximum distance between the zones in relief 62 is advantageously less than 2 mm. Such dimensioning makes it possible to prevent creep and/or crushing of these zones in relief 62 to ensure passage of the air. The distance between two zones in relief 62 of two adjacent pairs may be greater, on the other hand.

In a variant embodiment of the invention, the zones in relief extend as far as the level of the base of the bead without preferably extending beyond a limit corresponding to two-thirds of the rim seat when the tyre is mounted on a rim.

The zones in relief 62 are preferably made by the addition of a complementary element made of a material which is non-deformable at pressures of the order of 11 bar so as to ensure the presence of air ducts when these become necessary. This complementary element may be firmly connected to the tyre by any means known to the person skilled in the art and in particular by adhesive bonding, vulcanisation, mechanical assembly etc.

Figure 7:
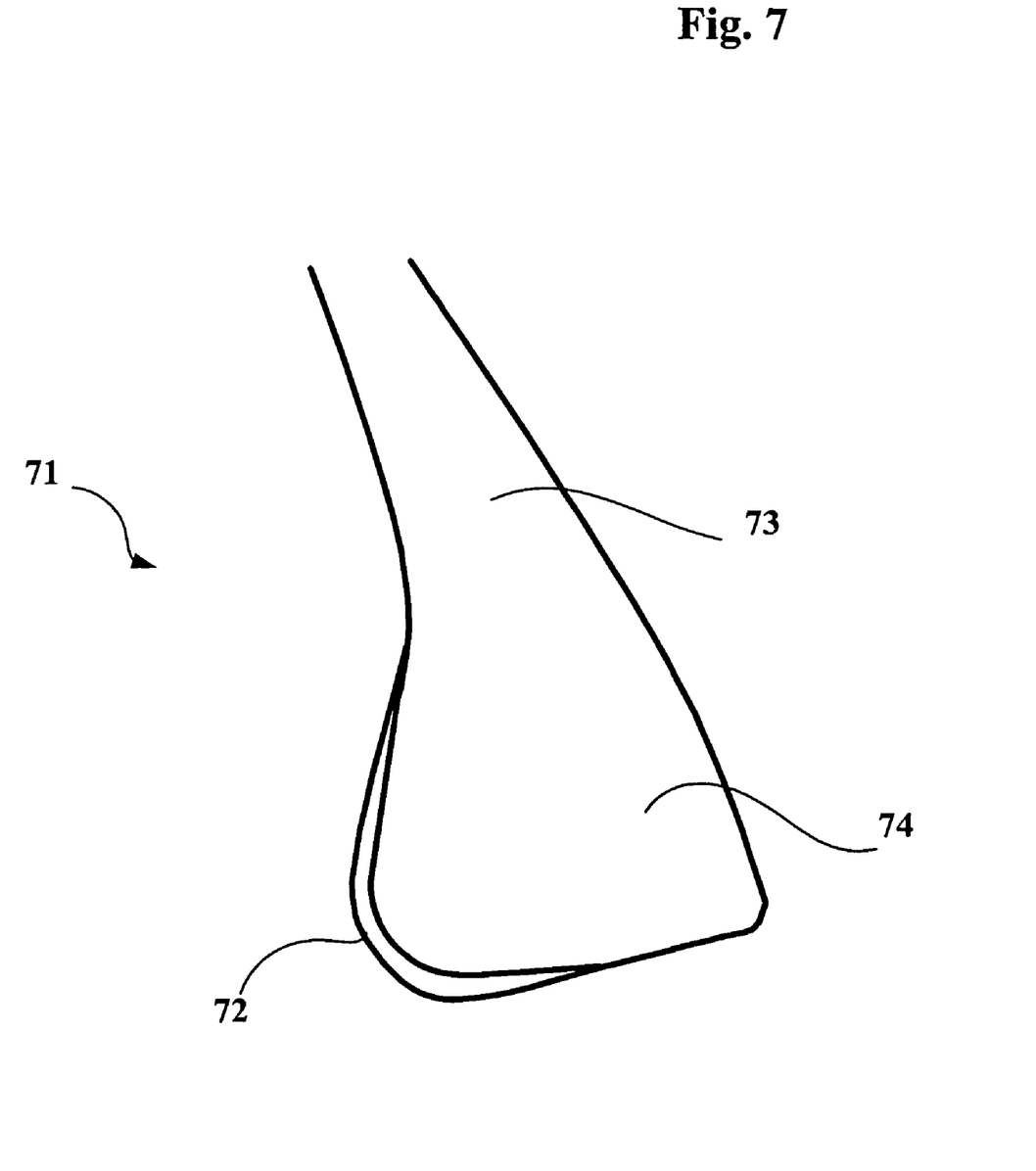
FIG. 7 is a diagram of a partial view in radial section of a tyre according to the invention.

FIG. 7 shows a tyre 71 according to the invention comprising a textile fabric fixed on part of the sidewall 73 and on part of the base of the bead 74. Use of such a fabric makes possible simplified production of a tyre. Furthermore, such a fabric retains its air drainage properties even when subjected to considerable pressures. The drainage function of the fabric is ensured by the fact that the fabric threads comprise a plurality of filaments.

However, the drainage function of the fabric requires said textile fabric to be positioned and orientated such that at least one end of a thread ends outside the tyre reception zone of the rim. At least some of the threads of the textile fabric are preferably oriented in the radial direction of the tyre. Use of a fabric comprising a crossed thread ply ensures that whatever the laying angle of the fabric, the above-stated condition is respected, namely one end of at least some of the threads is outside the tyre reception zone of the rim, the size of said fabric and its positioning on the tyre being adapted.

The invention also provides for combining of the rims and tyres as just described with reference to the Figures.

Use of a rim defined by the invention and/or of a tyre according to the invention therefore allows the production of tubeless mounted assemblies, intended for bicycles for road use, which do not exhibit any risk of the tyre rolling of the rim as a result of the operating pressure or of the pressures which may be reached in extreme situations.

Generally the invention should be understood as applying to all types of wheel which are to be combined with tyres comprising flexible bead wires and whose operating pressures are relatively high and in particular greater than 5 bar. Examples are wheels for wheelchairs for the disabled or alternatively vehicle wheels for low fuel consumption vehicles such as those in the "Shell Challenge".

The invention claimed is:

1. A mounted assembly of the tubeless type for a cycle, comprising a rim and a tire including beads, said rim comprising two wings attached to respective seats which receive the beads, a surface of the rim facing the tire forming a tire reception zone between the wings, wherein the rim includes a passage for stabilizing the air pressure of the tire's outer surface, in zones where the tire contacts neither the ground nor the rim, to a value of less than 2 bar, and said passage comprising a first end located in the reception zone and a second end opening outside said reception zone and wherein the passage widens in a direction away from the tire reception zone.

2. The mounted assembly according to claim 1 wherein the passage is operable to drain air from the tire to atmosphere when at least one of the beads is out of contact with its respective seat.

3. The mounted assembly according to claim 1 wherein said passage is arranged to stabilize said air pressure value to atmospheric pressure.

4. The mounted assembly according to claim 1 wherein the passage is disposed on the wings.

5. The mounted assembly according to claim 4 wherein the passage comprises a channel arrangement formed on the wings.

6. The mounted assembly according to claim 4 wherein the passage comprises a hole formed through the wings.

7. The mounted assembly according to claim 1 wherein the passage comprises a hole formed through the wings and/or the seats.

8. A mounted assembly of the tubeless type for a cycle, comprising a rim and a tire including beads, said rim comprising two wings attached to respective seats which receive the beads, the rim forming a tire reception zone between the wings, wherein the rim includes a channel arrangement formed on the wings for draining air from the tire to atmosphere when at least one of the beads is out of contact with its respective seat, and thereby stabilizes the air pressure at the level of the tire's outer surface, in zones where the tire contacts neither the ground nor the rim, to a value of less than 2 bar, and said channel arrangement comprising at least one channel formed along each wing surface, said channel comprising a first end located in the reception zone and a second end opening outside said reception zone and wherein said channel widens in a direction away from the tire reception zone.

9. The mounted assembly according to claim 8 wherein the channel arrangement is spaced from the seats.

10. The mounted assembly according to claim 9 wherein each wing includes a hook portion projecting toward the tire reception zone and forming an outer peripheral edge of the wing, a portion of each channel formed in a respective hook.

11. The mounted assembly according to claim 9 wherein each channel is formed between a pair of projections formed on the wing surface.

12. The mounted assembly according to claim 8 wherein the channel arrangement comprises at least one groove formed in each wing surface.

13. The mounted assembly according to claim 8 wherein, in accordance with the profile of the rim in a radial plane, the seats have a generatrix whose axially outer end lies on a circle of a diameter which is less than a diameter of a circle on which is located the axially inner of the generatrix, and wherein said generatrix is frustoconical and forms an angle with the axis of rotation of the tire of between 15 and 45 degrees.

* * * * *